United States Patent [19]

Alexander

[11] Patent Number: 4,613,542

[45] Date of Patent: Sep. 23, 1986

[54] METHOD OF IMPREGNATING A WATER-PENETRABLE ARTICLE WITH A SWELL-INHIBITED WATER SWELLABLE CLAY SLURRY

[75] Inventor: William Alexander, Naperville, Ill.

[73] Assignee: American Colloid Company, Skokie, Ill.

[21] Appl. No.: 766,766

[22] Filed: Aug. 16, 1985

Related U.S. Application Data

[63] Continuation-in-part of Ser. No. 720,559, Apr. 5, 1985.

[51] Int. Cl.[4] .......................... B32B 27/04; B32B 9/04; B32B 13/04; B05D 3/02
[52] U.S. Cl. ................................... 428/290; 427/243; 427/294; 427/296; 427/387; 427/389.9; 427/392; 427/395; 428/454; 524/446; 524/447
[58] Field of Search ................ 524/446, 447; 427/243, 427/296, 294, 387, 389.9, 392, 395; 428/290, 454

[56] References Cited

U.S. PATENT DOCUMENTS

| | | | |
|---|---|---|---|
| 3,764,530 | 10/1973 | Burland et al. | 526/223 |
| 3,825,441 | 7/1974 | Achermann et al. | 427/296 |
| 4,161,566 | 7/1979 | Higgins | 428/456 |
| 4,209,568 | 6/1980 | Clem | 428/454 |
| 4,339,479 | 7/1982 | Robbart | 427/296 |
| 4,467,015 | 8/1984 | Clem | 428/454 |
| 4,529,663 | 7/1985 | Lancaster | 428/457 |

FOREIGN PATENT DOCUMENTS

| | | | |
|---|---|---|---|
| 0734551 | 8/1961 | Canada | 524/447 |

*Primary Examiner*—Herbert J. Lilling

*Attorney, Agent, or Firm*—Mason, Kolehmainen, Rathburn & Wyss

[57] ABSTRACT

A method of impregnating a water-penetrable article with a clay slurry includes temporarily inhibiting the swellability of the clay to unexpectedly increase the clay content and decrease the viscosity of the slurry to achieve a higher clay content in a clay-impregnated, water-penetrable article. The swelling capacity of a water-swellable clay composition in contact with water is temporarily inhibited for greater impregnation of the clay into the fibrous article by mixing with a water-swellable clay a water soluble anionic polymer having a weight average molecular weight of about 2,000 to about 150,000 and water. The water soluble anionic polymers temporarily inhibit the swelling capacity of the water-swellable clays to decrease the viscosity of the clay slurry to achieve a higher clay content or more efficient and faster clay impregnation into a water-penetrable, e.g. fibrous, article. The water soluble anionic polymers having a weight average molecular weight in the range of 2,000 to 150,000 temporarily will inhibit the swelling of a water-swellable clay so that the clay solids content of the slurry can be approximately doubled for impregnation. The temporary swell-inhibiting properties of the relatively low molecular weight anionic polymers permit impregnation of a clay slurry having a relatively low viscosity so that the clay solids content of the slurry can be substantially increased for impregnation. Upon breakdown of the polymers to a weight average molecular weight below about 2,000, such as by heating above about 200° F., the clay reverts to its original properties.

22 Claims, No Drawings

METHOD OF IMPREGNATING A WATER-PENETRABLE ARTICLE WITH A SWELL-INHIBITED WATER SWELLABLE CLAY SLURRY

CROSS-REFERENCE TO RELATED APPLICATION

This application is a continuation-in-part of my copending application, Ser. No. 720,559, filed Apr. 5, 1985.

FIELD OF THE INVENTION

The present invention is directed to a method of impregnating a water-penetrable article, such as a mineral wool insulating body, with a water-swellable clay slurry. The swelling capacity of a water-swellable clay in a water slurry is inhibited so that the slurry can be more easily impregnated into a water-penetrable article at a lower viscosity and/or a higher solids content for unexpected savings in impregnation economy. More particularly, the present invention is directed to a fluid, water-swellable clay composition comprising a water-swellable clay, such as bentonite, an anionic polymer having a weight average molecular weight less than about 150,000 and water. The water-swellable clay is inhibited from swelling by the action of the anionic polymer until the clay composition has been transported to a treatment station, such as a drier, whereupon the anionic polymer is treated to reduce its molecular weight to a number average molecular weight less than about 2,000 to essentially destroy the swell-inhibiting properties of the polymer, thereby enabling the clay to be dried or otherwise treated at the treatment station, and to swell upon further contact with water.

BACKGROUND OF THE INVENTION AND PRIOR ART

Water-swellable clays, such as bentonite clay, are often slurried in water for the purpose of treating the clay in some manner. For example, water-swellable clays are slurried in water for the purpose of washing the clay for contaminant removal; for the purpose of reacting the clay, for example, to provide some ion exchange, as in peptizing, for the purpose of increasing the sodium ion or other ion content of the clay; for impregnating wool bodies, as disclosed in International Application No. PCT/F182/00029, published Feb. 3, 1983 under International Publication No. WO 83/00369, and as disclosed in my prior application Ser. No. 530,430 filed Sept. 8, 1983, now U.S. Pat. No. 4,514,510, for hydrogen ion exchange with a suitable hydrogen ion exchange resin for the purpose of reducing the acid demand of the clay. In each case, after treatment of the clay in water slurry form, the clay or impregnated article then is dried to a moisture content of 0–10% by weight.

The water-swellable clays are in a fully swollen form when in the water slurry and, therefore, in order to pump or otherwise transport the water-swellable clay slurry for further treatment, such as drying, the maximum clay solids content of the slurry, prior to the present invention, was approximately 5% clay by total weight of slurry. Any attempts to pump or otherwise transport a water-swellable clay slurry having a solids content greater than about 5% by weight have been unsuccessful because the clay slurry, including fully hydrated clay at a solids content greater than about 5% by weight, is much too viscous for transport and for effective homogenous treatment. As shown in the Hurd U.S. Pat. No. 2,431,481, typical prior art water-swellable clay slurries include a solids content of about 2.5 to 4.6% by weight solids for treatment such as ion exchange.

Further, in the environment of water-swellable clay slurry impregnation of mineral wool bodies, as disclosed in No. PCT/F182/00029, where pumping of the clay slurry is for only a short, recirculation distance, the clay content of the slurry is at most 10% by weight since, at higher levels, the viscosity of the slurry is too high causing a clay sediment on the surface of the mineral wool article, preventing further impregnation.

As set forth in this assignee's prior U.S. Pat. No. 4,279,547 and the McGoarty U.S. Pat. No. 4,316,833, certain organic solvents have the property of inhibiting the swelling characteristics of water-swellable clays, such as bentonite. Other prior art teaches that particular additives such as the high molecular weight polymers, such as polyacrylic acid, polyacrylamide and the like increase the swellability and viscosity characteristics of a water-swellable clay dispersion, such as disclosed in this assignee's prior U.S. Pat. Nos. 3,986,365; 4,084,382; and 4,087,365. The polymers and copolymers added for the purpose of increasing the water swellability of the water-swellable clays generally are very high molecular weight polymers, e.g. 200,000 to 2 million or more molecular weight, are added in a relatively small percentage and remain with the clays in a high molecular weight form in order to continue to beneficiate the clay to achieve a higher viscosity of the clay in water.

SUMMARY OF THE INVENTION

In brief, the present invention is directed to a method of impregnating a water-penetrable article with a swell-inhibited water-swellable clay composition. The clay composition comprises a water slurry of a water-swellable clay and a water soluble anionic polymer having a weight average molecular weight of about 2,000 to about 150,000. The water soluble anionic polymers temporarily inhibit the swelling capacity of the water-swellable clays to decrease the viscosity of the clay slurry for impregnation of a water-penetrable article. Drying the impregnated article at a temperature above about 200° F. breaks down the molecular weight of the polymers thereby rendering substantially ineffective their swell-inhibiting behavior.

In accordance with the principles of the present invention, it has been found that a water soluble anionic polymer having a weight average molecular weight in the range of 2,000 to 150,000 temporarily will inhibit the swelling of a water-swellable clay so that the clay solids content of the slurry can be approximately doubled for impregnation of a water-penetrable article. The temporary swell-inhibiting properties of the relatively low molecular weight anionic polymers permits impregnation and transportation of a clay slurry having a relatively low viscosity so that the clay solids content of the slurry can be substantially increased for impregnation and transport, such as recirculation to an impregnation station.

In accordance with an important, new and unexpected feature of the present invention, at a drying station, the impregnated article can be treated, such as by heating to a temperature of 200° F. to 300° F. to break down the molecular weight of the anionic polymer to less than about 2,000 weight average molecular weight to destroy the clay swell-inhibiting properties of the anionic polymer should it be desirable to retain the water-swellability of the clay, for example, if the impregnated article is used in a water absorbing or retaining environment. Quite unexpectedly, molecular weight breakdown of the anionic polymer permits the water-swellable clay to substantially completely swell when again contacted with water without any residual swell inhibition remaining so that the clay can be dried and thereafter will substantially completely swell upon contact with water. The concentration of the anionic polymer having a weight average molecular weight in the range of 2,000 to 150,000 should be about 0.005% to about 0.5% by weight based on the dry weight of water-swellable clay in the slurry.

Accordingly, an object of the present invention is to provide a method of impregnating a water-penetrable article with a water-swellable clay slurry wherein the clay is temporarily and reversibly inhibited from swelling.

Another object of the present invention is to provide a method of impregnating a water-penetrable article with a water-swellable clay slurry having reversibly inhibited swell and viscosity characteristics.

A further object of the present invention is to provide a method of temporarily and reversibly inhibiting the hydration of a water-swellable clay impregnation slurry by contacting the water-swellable clay with a water soluble anionic polymer having a weight average molecular weight of 2,000 to 150,000.

Another object of the present invention is to provide a method of increasing the compressive strength of a water-penetrable fibrous article by impregnating the article with a slurry comprising a water-swellable clay and an anionic polymer having a weight average molecular weight of 2,000 to 150,000.

Another object of the present invention is to provide a method of impregnating a fibrous article with a water swellable clay to provide a water swellable article of manufacture capable of substantial water absorption, swelling, and capable of preventing the penetration of water therethrough.

Still another object of the present invention is to provide a method of impregnating a water-penetrable article with a water slurry of a water-swellable clay and a water soluble anionic polymer to temporarily inhibit the clay in the impregnation slurry from hydration while in contact with water to maintain a relatively low slurry viscosity, to achieve a relatively high clay solids content in the slurry and in the impregnated article, and to achieve water-swellable clay slurry impregnation of a water-penetrable article with a water-swellable clay at a relatively low slurry water content.

Another object of the present invention is to provide a method of impregnating a water-penetrable fibrous article with a water-swellable clay slurry composition including 6–15% by weight water-swellable, swell-inhibited clay; water; and a water soluble anionic polymer capable of inhibiting the swelling of the clay and having a weight average molecular weight of 2,000 to 150,000 and, after clay treatment, a method of treating the clay slurry composition, such as by heating the composition, to reduce the molecular weight of the anionic polymer sufficiently to destroy its swell-inhibiting characteristics to form an impregnated fibrous article including a substantial weight percentage, e.g. 10–75% of water-swellable clay having complete swelling properties.

The above and other objects and advantages of the present invention will become apparent from the following detailed description of the preferred embodiment.

DETAILED DESCRIPTION OF THE PREFERRED EMBODIMENT

In accordance with an important feature of the present invention it has been found that a water soluble, anionic polymer having a weight average molecular weight of about 150,000 or less will reversibly inhibit the water-swellability of a water-swellable clay dispersed or colloidally suspended in water. By inhibiting the water swelling of the clay while in contact with water, prior to impregnation of a water-penetrable article, a water-swellable clay slurry impregnating composition is provided having a relatively low viscosity at a given relatively high solids content to aid in more effectively impregnate the article at a higher clay solids content and/or lower viscosity. Thereafter, the swell-inhibiting characteristics of the anionic polymer can be destroyed, if beneficial, such as by heating during drying, to provide a water-swellable clay impregnated article including a water-swellable clay capable of complete and uninhibited hydration upon contact with water. It has been found that the water soluble anionic polymers capable of inhibiting swellability of a water-swellable clay are broken down to smaller weight average molecular weights less than about 2,000 upon heating to a temperature of about 210–500° F. during drying of the clay slurry so that the dried clay is no longer inhibited from swelling upon further contact with water.

The water-swellable colloidal clay utilized in the impregnating composition of the present invention is any water swellable colloidal clay which will hydrate in the presence of water, i.e., will swell when in contact with fresh (non-contaminated) water. The most surprising results are obtained with the montmorillonite clays, i.e., bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with the present invention may also contain other cations such as magnesium and iron.

There are cases wherein a montmorillonite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorite and Saponite. The colloidal clay, i.e., bentonite, generally is finely divided as known for use in water barrier panels and the like, i.e, 150 to 350 mesh.

Useful anionic polymers are the water soluble polymers of olefinic structure, that is with a structure prepared by the polymerization of at least one compound with a single aliphatic unsaturated group, which compounds are polymerized to a weight average molecular weight of 2,000 to 150,000. To be water soluble these polymers must necessarily have substituents such as carboxy acids, carboxy acid salts and carboxy acid anhydrides, and in contact with water, ionize to form polymeric ions with a substantial number of negatively charged sites. One type of compound useful in the practice of this invention is the polymer of a carboxylic acid, such as acrylic acid, methacrylic acid, crotonic acid and the sodium, potassium, calcium and ammonium salts of said polymeric acids. Copolymers of these acids, or salts thereof, and other olefinic compounds such as ethylene, proplylene, isobutylene, styrene, α-methyl styrene, vinyl acetate, vinyl formate, vinyl alkyl ethers, alkyl acrylates and alkyl halides may also be used in the practice of this invention. Copolymers of more than two olefinic substances will be useful provided that at least one of the compounds contains carboxy anhydride or carboxy salt nuclei or other nuclei which are capable of being converted chemically into one of the said carboxy strucures.

Another very useful type of polymer is the copolymers of dicarboxylic acid anhydride or derivatives thereof. These polymers are usually comprised of equal molar proportions of the dicarboxylic acid, for example maleic, fumaric, itaconic, citroconic and aconitic acids, the alkali metal, alkaline earth metal and the salts of these acids, and the partially esterified dicarboxylic acids of the type mentioned, and other olefinic monomers copolymerizable therewith, for example, ethylene, propylene, isobutylene, styrene, α-methyl styrene, vinyl acetate, vinyl chloride, vinyl formate, vinyl alkyl ethers, alkyl acrylates and alkyl methacrylates. If desired, one of the comonomeric compounds may be an amide or a quaternary ammonium salt, either substituent of which has a cationic influence, but copolymers involving such cationic substituents must necessarily have present carboxy, carboxy salt or carboxylic anhydride nuclei to overcome the cationic effects and render the whole polymer anionic. Alternatively the maleic acid may be esterified provided that ionizable carboxy groups are present in the monomer or on the maleic acid grouping, such as in the copolymer of vinyl acetate and the partial methyl ester of maleic acid. If maleic anhydride is copolymerized, it will be hydrolyzed to the acid when the aqueous bentonite slurries are prepared.

One important type of these copolymers is the polycarboxylic acids or salts thereof prepared by the hydrolysis of polyacrylonitrile, or the hydrolysis of copolymers of acrylonitrile and other olefinic monomers. In the preparation of these polymers it is necessary for the hydrolysis to proceed past the amide stage, where the polymers are cationic, to the carboxy acid or carboxy acid salt, which are anionic and therefore useful in the practice of this invention. The hydrolysis may be effected with acids as catalysts, or in the presence of alkali metal hydroxides where the corresponding alkali metal polyacrylates are produced, such as sodium polyacrylates. Alternatively, the alkali metal polyacrylates may be prepared by first polymerizing the acid and then neutralizing the resulting polymer.

Another useful polymer is the polyacrylamides, but to be effective it must have some carboxy substituents. The useful compounds of this type may be prepared by partial hydrolysis of polyacrylonitrile or by polymerization of acrylamide under conditions favoring hydrolysis, or by a polymerization followed by a separate hydrolysis step.

Other useful polymers include water-soluble polymers of sodium styrenesulfonate and the like, and copolymers with the carboxy acids, carboxy acid salts, and carboxy acid anhydrides, or with suitable monoethylenically unsaturated monomers such as ethylene, propylene, styrene, methacrylamide, vinyl alkanoic esters, vinyl chloride, maleic anhydride and the like. Other suitable polymers are the polymers and the copolymers of sulfonated alkyl acrylates and methacrylates, aminoalkyl acrylates and methacrylates and water-soluble salts of copolymers of maleic anhydride with a vinyl-aromatic compound. The preferred anionic polymers are polyacrylic acid and its water soluble salts, such as sodium polyacrylate.

The water soluble anionic polymers included in the water-swellable clay slurry impregnating compositions of the present invention, having a weight average molecular weight less than about 150,000, can be combined with the clay before or after the clay is swollen. It is particularly advantageous to add the anionic polymer to water before, or at the same time as the water-swellable clay is added to water since it is easier to completely mix the anionic polymer into the water for homogenous contact with the water-swellable clay before the clay has had a chance to hydrate and substantially increase the viscosity of the clay-water slurry. If the anionic polymer is added after the clay is substantially or completely hydrated, the anionic polymer will cause the clay to shrink or expel water, but it is more difficult to achieve a homogeneous contact of polymer with minimum water in the slurry after the clay is hydrated at high solids content, e.g. 10–15% by weight clay solids.

As set forth in the following TABLE I, the first six examples represent bentonite slurries in water having bentonite levels ranging from 10% by weight to 15% by weight before drying. The viscosity before drying and before polymer addition was measured using a Brookfield LVT viscometer using a No. 3 spindle at 60 R.P.M., then a sodium polyacrylate polymer (fully neutralized) was added having a weight average molecular weight of 8000, in an amount of 0.25% based on the dry weight of bentonite in each slurry, and the viscosity again measured in the same manner. Quite surprisingly, the viscosity was reduced to a viscosity of only 33.2% to 38.1% of the viscosity before polymer addition. Further, the bentonite compositions after the polymer treatment of the present invention and drying, when re-slurried to a 5% by weight bentonite solids content, retained substantially 100% of the swellability of a 5% by weight solids slurry before the polymer treatment.

TABLE I

| Example | Solids Before Drying | Viscosity Before Drying No Polymer (cps) | Viscosity After Polymer Before Drying (cps) | % by wt. of Original Viscosity | Viscosity After Drying (cps) |
| --- | --- | --- | --- | --- | --- |
| 1 | 15% | 1200 | 425 | 35.4 | 360 |
| 2 | 14% | 1100 | 420 | 38.2 | 355 |
| 3 | 13% | 1250 | 415 | 33.2 | 370 |
| 4 | 12% | 1050 | 400 | 38.1 | 350 |
| 5 | 11% | 1200 | 400 | 33.3 | 371 |
| 5 | 10% | 1250 | 450 | 36.0 | 350 |

As set forth in the following TABLE II, Examples 7–16 represent bentonite slurries prepared at 12% by weight bentonite solids with the addition of various amounts (0 to 1.0% by weight) of a sodium polyacrylate polymer (fully neutralized) having a weight average molecular weight of 8000. The viscosity was measured using a Brookfield LVT viscometer using a No. 3 spindle at 60 R.P.M., after the polymer addition to determine the viscosity reduction upon each different rate of polymer addiion. Further, the bentonite compositions, after the polymer treatment of the present invention and drying, when re-slurried to a 5% by weight bentonite solids content, retained substantially 100% percent of the swellability of a 5% by weight solids slurry before the polymer treatment.

TABLE II

| Example | Polymer Amount (% by wt.) | Solids Before Drying (% by wt.) | Viscosity Polymer Before Drying (cps) | Viscosity After Drying at 5% solids) (cps) |
|---|---|---|---|---|
| 7 | 0 | 12% | 1200 | 350 |
| 8 | .005 | 12% | 800 | |
| 9 | .01 | 12% | 750 | 349 |
| 10 | .02 | 12% | 700 | 350 |
| 11 | .04 | 12% | 640 | 358 |
| 12 | .08 | 12% | 590 | 362 |
| 13 | .16 | 12% | 500 | |
| 14 | .32 | 12% | 400 | 360 |
| 15 | .64 | 12% | 200 | 300 |
| 16 | 1.0 | 12% | 150 | 250 |

The water-penetrable article impregnated with the swell-inhibited water-swellable clay composition may be any water-penetrable article capable of absorbing, to a desired depth, the swell-inhibited slurry described herein. With this penetration depth in mind, the water-swellable clay can be ground to any desired fine size so that the clay can penetrate the article.

Examples of suitable water-penetrable articles advantageously impregnated with a water-swellable clay include, in particular, fibrous articles, such as fiberboard, particle board, insulation board, panelboard, acoustical board and any other consolidated man-made board manufactured either by the wet or dry process as known in the paper and hardboard industries, including cellulosic fibers, any synthetic fibers, glass fiber, aluminum silicate fibers, asbestos fibers, mineral wool fibers, and the like. The fibrous articles are made by disposing fibers and a natural or synthetic binder, with or without various fillers, extenders, pigments and the like, onto a support surface to form a mat of loosely disassociated fibers and binder, and pressing the fibers together to consolidate the fibers into a desired shape wherein the fibers are firmly bound together. In the wet process, the fibrous raw material is uniformly blended in a head box with copious quantities of water to form a slurry. The slurry is deposited onto a water-pervious support member, generally a Fourdrinier wire, where much of the water is removed leaving a wet mat of cellulosic material. The wet mat is then dried to consolidate, as in the manufacture of insulation board, or can be transferred from the pervious support member and consolidated under heat and pressure to form the board. Typically, pressures of from 400 to 500 psi and temperatures up to about 400° F. are encountered in hot-press consolidation of a man-made board manufactured by the wet process. The dry process is similar to the wet process except that the cellulosic fibers are first coated with a thermosetting resin binder, such as a phenol-formaldehyde resin, and are then randomly distributed into a mat by air blowing the resin-coated fibers onto a support member. In the dry process, the mat is pressed at temperatures up to about 450° F. and pressures less than about 1000 psi to cure the thermosetting resin and to compress the mat into an integral consolidated structure.

It is known to impregnate incompletely consolidated mats, wet or dry, with a desired component, such as a flame retardant, in order to take advantage of the increased permeability of the mat, prior to complete consolidation. Sometimes, particularly in the wet process, an impregnating solution or suspension is applied on an upper surface of the incompletely consolidated mat while applying vacuum to an undersurface of the mat to achieve deeper and faster penetration of the impregnating composition. The water-swellable clay slurry of the present invention can be applied to water-penetrable articles, such as described, in any stage of manufacture of the articles, or after the articles are completely formed, molded, or consolidated.

The impregnating clay slurry generally includes about 10–15% by weight of the water-swellable clay, but can contain any percentage of about 1% clay up to the maximum transportable, by whatever means, to the water-penetrable article. The more permeable the article, such as a loose fibrous mat prior to consolidation, the higher the percentage of water-swellable clay capable of penetrating into the article. It has been found that slurries having up to about 50% swell-inhibited, water-swellable clay will impregnate loosely associated fibrous articles, relatively uniformly, although some increased clay concentration may occur at and near the impregnating slurry-contacting surface. Such articles can be impregnated to include up to about 75% by weight water-swellable clay, based on the dry weight of the article.

The present invention is particularly advantageous for impregnation of fibrous acoustical or insulative articles containing mineral wool and/or asbestos fibers. The mineral wool fibers can have essentially any dimensions or can be granulated or formed into nodules or tufts of mineral wool by conventional means. For example, the mineral wool may be fiberized by applying a stream of molten slag on the surface of a horizontal rotor which divides the slag into a multiplicity of individual streams thrown off the rotor periphery by centrifugal force. A blast of steam or air is directed against the streams to attenuate the molten slag in stream form into relatively long, individual fibers. The fibers are then collected in a collection chamber to form a blanket or mat of mineral wool fibers.

The method of forming tufts or granules of mineral wool from the blanket formed in the collection chamber is illustrated in U.S. Pat. No. 2,375,284. A stationary rack and a rotatable paddle rack operate in the manner of complementing combs to tear small granules or tufts of fibers from the blanket and deposit them on a conveyor.

The process and slurry composition disclosed herein is operable on any water-penetrable article, fibrous or otherwise, containing any type of fibers, or combination of fibers. When a mineral wool product is fired to produce a ceramic type article, it is necessary, of course, to impregnate the article with the clay slurry prior to firing since the article is no longer water-penetrable after firing at typical temperatures of 1000 to 1500° F. Various additives, such as the sodium carbonate, sodium bicarbonate or sodium hydroxide disclosed in U.S. Pat. Nos. 3,136,683 and 3,549,485; binders; pigments, fillers, and the like can be added to the clay slurry to provide any desired property to the impregnated article.

One particular advantage of the present invention is that substantially lower shrinkage of the impregnated articles is experienced during drying since the clay impregnated into the article is essentially un-expanded. Accordingly, new and unexpected dimensional stability during manufacture of an article impregnated with a water slurry of water-swellable clay makes it much easier to provide an article of exacting dimensions and small tolerances.

I claim:

1. A method of impregnating a water-penetrable article with a water slurry of a water-swellable clay comprising contacting a surface of the water-penetrable article with the clay slurry wherein the slurry includes water, a water-swellable clay and an anionic polymer having a weight average molecular weight of about 2,000 to about 150,000.

2. The method of claim 1 wherein the weight average molecular weight of the anionic polymer is about 2,000 to about 100,000.

3. The method of claim 1 further including reducing the molecular weight of the anionic polymer to a weight average molecular weight below 2,000 to permit the water-swellable clay to substantially swell.

4. The method of claim 1 wherein the anionic polymer is a carboxy acid polymer.

5. The method of claim 4 wherein the anionic polymer is a polymer or copolymer containing acrylic acid or a derivative of acrylic acid.

6. The method of claim 1 wherein the concentration of anionic polymer is 0.005% to 0.5% by weight based on the dry weight of water-swellable clay in the slurry.

7. The method of claim 1 wherein the water-penetrable article is impregnated by contacting the slurry on one surface of the article and subjecting an opposite side of the article to vacuum.

8. The method of claim 1 wherein the water-penetrable article comprises a mineral wool based insulating body.

9. The method of claim 1 wherein the water-penetrable article comprises a man-made consolidated board including cellulosic fibers.

10. The method of claim 1 wherein the water-penetrable article comprises a mat of fibers, including cellulosic fibers, not yet consolidated and including hot-pressing the impregnated mat to consolidate the mat and lower the molecular weight of the anionic polymer.

11. The method of claim 1 wherein the water-penetrable article comprises a relatively lightweight water-laid or air-laid cellulosic fibrous article including a binder to adhere said cellulosic fibers together, and wherein the article is disposed in a vacuum chamber above a slurry-penetrable support member; the slurry is fed onto the article, and vacuum is drawn from below the article to suck the slurry completely through the article.

12. The method of claim 11 including recirculating the slurry sucked through the board back above the board for impregnation thereof.

13. The method of claim 1 wherein the water-penetrable article comprises a tubular article and wherein the tubular article is impregnated by disposing a longitudinal central aperture of the tubular article around a perforated tube and drawing vacuum through the tube while contacting an outer surface of the tubular article with said clay slurry.

14. The method of claim 1 including drying the impregnated article at a temperature of at least 200° F. to lower the molecular weight of the anionic polymer impregnated into the article with the clay slurry.

15. The article manufactured by the method of claim 1.

16. A method of impregnating a water-penetrable article with a water-swellable clay slurry, comprising:
mixing a water-swellable clay, water and an anionic polymer having a weight average molecular weight less than 150,000 to form a slurry including an inhibited, water-swellable clay;
impregnating the water-penetrable article with said slurry; and thereafter
treating the impregnated article to reduce the molecular weight of the anionic polymer to substantially decrease the swell inhibiting effect of the anionic polymer thereby permitting the impregnated water-swellable clay to substantially increase its swell in the article when the article is thereafter contacted with water.

17. The method of claim 16 wherein the concentration of anionic polymer is 0.005% to 0.5% by weight based on the dry weight of water-swellable clay in the slurry.

18. The method of claim 17 wherein the water swellable clay is included in an amount of greater than 5% and up to 20% by weight based on the total weight of water-swellable clay and water in the slurry.

19. The method of claim 16 wherein the anionic polymer is a carboxy acid polymer.

20. The method of claim 19 wherein the anionic polymer is a polymer or copolymer containing acrylic acid or a derivative of acrylic acid.

21. The method of claim 19 wherein the anionic polymer is a polymer including carboxy acid, carboxy acid salt or carboxy acid anhydride substituents and ionize in water to provide a plurality of negatively charged sites.

22. The method of claim 21 wherein the anionic polymer is a copolymer including a dicarboxylic acid anhydride or a derivative thereof.

* * * * *